US012680960B2

(12) United States Patent
Schinwald et al.

(10) Patent No.: US 12,680,960 B2
(45) Date of Patent: Jul. 14, 2026

(54) SYSTEM AND METHOD FOR MEASURING OPTICAL DETECTOR SIGNALS HAVING EXTENDED DYNAMIC RANGE

(71) Applicant: Molecular Devices (Austria) GmbH, Puch (AT)

(72) Inventors: Bernhard Schinwald, Puch (AT); Michael Katzlinger, Puch (AT); Georg Kronberger, Puch (AT)

(73) Assignee: Molecular Devices (Austria) GmbH, Puch (AT)

( * ) Notice: Subject to any disclaimer, the term of this patent is extended or adjusted under 35 U.S.C. 154(b) by 302 days.

(21) Appl. No.: 18/282,955

(22) PCT Filed: Mar. 21, 2022

(86) PCT No.: PCT/IB2022/000137
§ 371 (c)(1),
(2) Date: Sep. 19, 2023

(87) PCT Pub. No.: WO2022/200856
PCT Pub. Date: Sep. 29, 2022

(65) Prior Publication Data
US 2024/0151647 A1      May 9, 2024

Related U.S. Application Data

(60) Provisional application No. 63/166,140, filed on Mar. 25, 2021.

(51) Int. Cl.
*G01N 21/64* (2006.01)
(52) U.S. Cl.
CPC ................................. *G01N 21/6452* (2013.01)

(58) Field of Classification Search
CPC .......................... G01N 21/6452; G01N 21/253
See application file for complete search history.

(56) References Cited

U.S. PATENT DOCUMENTS 6,232,608 B1 *   5/2001   Giebeler ............ G01N 21/6452
                                                    250/459.1
9,366,570 B1 *   6/2016   Wiser ........................ G01J 1/44
                         (Continued)

FOREIGN PATENT DOCUMENTS

EP         2120684         11/2009

OTHER PUBLICATIONS

International Search Report and Written Opinion in connection with International Application No. PCT/IB2022/000137, issued Jun. 23, 2022 (12 pages).

*Primary Examiner* — Michelle M Iacoletti
*Assistant Examiner* — Mohamed Doumbia
(74) *Attorney, Agent, or Firm* — Merchant & Gould P.C.

(57) ABSTRACT

A measurement system comprises an optical detector, a plurality of power sources operable to provide different outputs, and a controllable circuit operable to couple a first selected one of the plurality of power sources to the optical detector. A programmable device is operable when each of the plurality of power sources is providing an associated power output to: (a.) obtain a first measurement from the optical detector while the first selected one of the plurality of power sources is coupled to the optical detector; (b) cause the controllable circuit to couple a second selected one of the plurality of power sources to the optical detector in response to the first measurement; and (c) obtain a second measurement from the optical detector while the second selected one of the plurality of power sources is coupled to the optical detector. Optical measurement methods are also disclosed.

18 Claims, 6 Drawing Sheets

(56) References Cited

U.S. PATENT DOCUMENTS

2007/0104493 A1\*  5/2007  Kimura ................ H03F 1/3205
                                           398/202
2011/0192957 A1\*  8/2011  Oldham ................... G01J 1/42
                                       250/208.1

\* cited by examiner

SYSTEM AND METHOD FOR MEASURING OPTICAL DETECTOR SIGNALS HAVING EXTENDED DYNAMIC RANGE

CROSS REFERENCE TO RELATED APPLICATIONS

This application is a National Stage Application of PCT/IB2022/000137, filed Mar. 21, 2022, which claims the benefit U.S. Provisional Patent Application No. 63/166,140, filed Mar. 25, 2021, the disclosures of which are incorporated herein by reference in their entireties. To the extent appropriate, a claim of priority is made to each of the above disclosed applications.

FIELD OF DISCLOSURE

The present subject matter relates to a system and method for measuring optical detector signals having extended dynamic range.

BACKGROUND

Optical measurement devices, such as photomultiplier tubes or avalanche photodiodes are used to obtain measurements of product samples. For example, a microplate reader system may be used to detect or measure the response of product samples, such as biological samples, to stimuli. The product samples are disposed on a microplate that includes a predetermined number of wells configured in a two-dimensional array, and a product sample (e.g., one or more cells) of a biological material may be disposed in each well.

The stimulus may be exposure to radiation (such as light), a chemical, an electrical field, or an interaction with another biological material. In some cases, the response includes emission of light as a result of fluorescence, chemiluminescence, bioluminescence, electroluminescence, thermoluminescence, and the like, or absorption of particular wavelengths of light, or production of a byproduct. The presence and/or magnitude of one or more such response(s) may be measured using a microplate reader.

In addition, the microplate reader typically includes apparatus that provides the stimulus to the product sample including one or more light sources, electrical probes to provide electrical stimulation, one or more micro-pipette(s) for delivering a predetermined amount of one or more reagent(s), and the like. The microplate reader also includes one or more filters and one or more detectors. Each type of filter allows particular wavelengths of light emitted by the stimulated sample to pass therethrough before being detected by the detector.

For example, the microplate reader may include photomultiplier tube detectors or avalanche photodiode detectors to detect light emitted by the sample. In order to be able to use the entire possible dynamic range of such detectors in analog mode using a light source e.g., a flash lamp, the high voltage supplied to the detector has to be set to different levels (e.g. ~500V/~750 V/~1000V) to achieve different signal amplification (e.g. ~1/~10/~100) and adapt the detector sensitivity to the signal strength resulting from detection of illumination transmitted through, reflected from, or emitted by the sample.

SUMMARY

It has been found that in measurement systems and methods that use an optical detector to measure signals, a change in a high voltage level supplied to the optical detector by a power source to modify the sensitivity of the optical detector results in a relatively long delay between measurements as the output voltage of the power source settles. For example, changing the high voltage level may result in the need to wait for a settling time of 10 seconds until the measurement system has reached stable sensitivity. Only after this settling time can reproducible detection of signals be performed.

This required settling time negates the possibility of performing a fast, real-time signal acquisition of all possible signal levels within the dynamic range of the system. Hence, there is a need for a measurement system that includes an optical detector that can be operated to perform fast, real-time signal acquisition for all signal levels within the dynamic range of the measurement system. This would allow the microplate reader that incorporates such measurement system to undertake rapid reading of multiple product samples over a consistent period of time from well to well of a microplate and from microplate to microplate and facilitate kinetic measurements of multiple product samples.

In to one embodiment, a measurement system is disclosed comprising an optical detector, a plurality of power sources operable to provide different outputs, and a controllable circuit operable to couple a first selected one of the plurality of power sources to the optical detector. A programmable device is operable when each of the plurality of power sources is providing an associated power output to: (a.) obtain a first measurement from the optical detector while the first selected one of the plurality of power sources is coupled to the optical detector; (b.) cause the controllable circuit to couple a second selected one of the plurality of power sources to the optical detector in response to the first measurement; and (c.) obtain a second measurement from the optical detector while the second selected one of the plurality of power sources is coupled to the optical detector.

Because the programmable device of the measurement system is operable to obtain a first measurement, cause coupling of a second selected one of the power sources to the optical detector in response to the first measurement, and obtain a second measurement while the second selected second one of the power sources is coupled to the optical detector, the measurement system can rapidly switch the power source output provided to the optical detector and thus select the dynamic range of the output of the optical detector to obtain fast, real-time signal acquisition over the entire dynamic range of the system. Inasmuch as each power source operates in a continuous manner following initial energization to supply a particular constant output voltage level associated therewith, such rapid switching between power sources does not require the output voltage supplied by any power source to have to restabilize before the optical detector may be used to obtain a measurement.

In some embodiments the optical detector comprises a photomultiplier tube, which can be operated at a fast rate.

In other embodiments the measurement system comprises an analog-to-digital converter and the power source is selected so that the output of the optical detector does not overflow the analog-to-digital converter.

In still further embodiments the programmable device compares the first measurement to at least one selected threshold range. Comparing the measurement to the threshold range further prevents the optical detector from generating an output signal that could overflow an analog-to-digital converter of the system.

In additional embodiments the programmable device is further operable to couple one of the power sources to the optical detector based on a comparison of the first measurement to at least one selected threshold range. Coupling one of the power sources based on such comparison enables the optical detector to operate with a high dynamic range without overflowing an analog-to-digital converter of the system.

According to other embodiments, the plurality of power sources comprises first and second power sources. Using two power sources allows switching the optical detector to generate an output signal in accordance with one of two dynamic ranges.

In still further embodiments, the plurality of power sources comprises first, second, and third power sources. Using three power sources allows switching the optical detector to generate an output signal in accordance with one of three dynamic ranges.

In still other embodiments, the first selected one of the plurality of power sources is identical to the second selected one of the plurality of power sources. Thus, the programmable device does not cause the controllable circuit to switch the power source that is coupled to the optical detector unless an improvement in the dynamic range of the system (or another benefit) could be realized.

In some embodiments, the optical detector is operable to develop a measurement voltage magnitude in response to a sensing of a product sample.

In some cases, the first measurement and second measurement are first and second voltage magnitudes, respectively. Further, the programmable device is operable to obtain one or more measurements from the optical detector while the second selected one of the plurality of power sources is coupled to the optical detector and is further operable to average measurements in the event that more than one measurement is obtained. Averaging multiple measurements in this manner can increase measurement accuracy.

In still other embodiments the system further includes a third power source that develops a third output, wherein the controllable circuit is operable to couple a first selected one of the first, second, and third power sources to the optical detector at a first time, and wherein the programmable device is operable to cause the controllable circuit to couple a second selected one of the first, second, and third power sources to the optical detector at a second time after the first time and obtain the second measurement while the second selected one of the first, second, and third power sources is coupled to the optical detector.

In some embodiments, the first selected one of the plurality of power sources is different than the second selected one of the plurality of power sources and wherein the programmable device is operable to decouple the first selected one of the plurality of power sources from the optical detector at a first time and couple the second selected one of the power sources to the optical detector at a second time five milliseconds or less following the first time.

According to another aspect, an optical measurement method comprises (a.) providing a photomultiplier tube (PMT) circuit operable to measure an optical characteristic of a sample and at least first and second power sources that develop first and second different power source output voltages, respectively, a controllable circuit operable in response to at least one control signal to selectively couple the PMT circuit to one of the at least first power source and a second power source, and a programmable device. The method further includes the step of (b.) operating the programmable device to develop the at least one control signal and to undertake the steps of (i.) causing the controllable circuit to couple the PMT circuit to the first power source, (ii) obtaining a first measurement from PMT circuit, (iii.) evaluating a characteristic of the first measurement, (iv.) causing the controllable circuit to couple the PMT circuit to a selected one of the at least first and second power sources based upon the evaluated characteristic of the first measurement at or following a second time, and (v.) obtaining a second measurement from the PMT circuit after the step (b.)(iv.) while the selected one of the first and second power sources is coupled to the PMT circuit.

By obtaining a first measurement from the PMT circuit, causing the controllable circuit to couple the PMT circuit to a selected one of the at least first and second power sources in response to an evaluated characteristic for the first measurement, and obtaining a second measurement from the PMT circuit while the selected one of the power sources is coupled to the PMT circuit, the power source output provided to the PMT circuit can be rapidly switched to select the dynamic range of the output of the PMT circuit. Such rapid switching facilitates obtaining fast, real-time signal acquisition over the entire dynamic range of the system. Each power source operates in a continuous manner following initial energization to supply a particular constant output voltage level associated therewith, so rapidly switching between power sources does not require the output voltage supplied by any power source to have to restabilize before the PMT circuit may be used to obtain a measurement.

In further embodiments the programmable device is operable while undertaking step (b.)(iii.) to compare a voltage magnitude developed by the PMT circuit to at least one selected threshold range.

In some embodiments, the at least one threshold range is selected to prevent overflow of an analog-to-digital converter that receives the second measurement.

According to still further embodiments, the step (a.) further comprises the step of providing a third power source that develops a third power source output voltage different than the first and second power source output voltages, wherein the controllable circuit is operable to couple a first selected one of the first, second, and third power sources to the PMT circuit, and wherein the programmable device is operable to cause the controllable circuit to couple the PMT circuit to a second selected one of the first, second, and third power sources to the optical detector based upon the evaluated characteristic of the first measurement. Using three power sources allows switching the PMT circuit to generate an output signal in accordance with three dynamic ranges.

In some embodiments, the step (b.)(iv.) comprises causing the controllable circuit to couple the PMT circuit to the first power source so that the dynamic range of the output signal generated by the PMT circuit is identical when the first and second measurements are obtained.

In some embodiments, the selected one of the at least first and second power sources comprises the second power source and wherein the programmable device is operable to decouple the first power source from the PMT circuit at a first time and couple the second power source to the PMT circuit at a second time five milliseconds or less following the first time.

Other aspects and advantages will become apparent upon consideration of the following detailed description and the attached figures wherein like numerals designate like structures throughout the specification.

DETAILED DESCRIPTION

Figure 1:
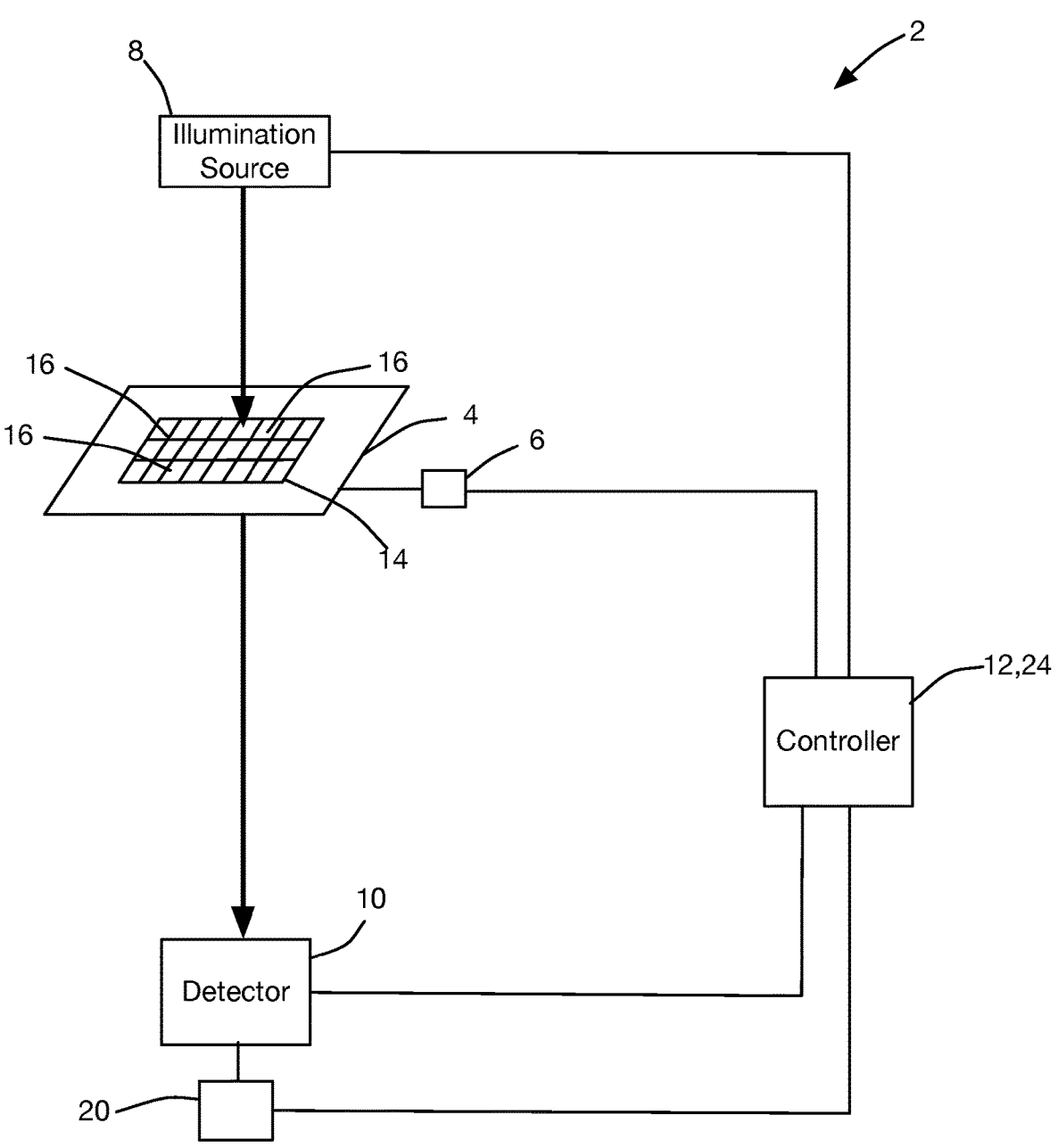
FIG. 1 is a block diagram of a microplate reader system.

As described in greater detail below, a microplate reader system includes a microplate holder on which a microplate having a plurality of wells may be disposed, a stimulus source (such as a light source, micropipette, etc.), an optical detector such as a photomultiplier tube or an avalanche photomultiplier, a circuit associated with the optical detector, and a plurality of DC power sources that develop voltage magnitudes and are selectively couplable to the optical detector/associated circuit to present a voltage thereto. As would be understood by one who has ordinary skill in the art, the dynamic range of an output signal of the optical detector varies in accordance with the voltage supplied thereto.

During operation of the microplate reader system, a product sample of a plurality of product samples to be analyzed is disposed in each well of the plurality of wells. The controller operates a microplate positioning mechanism to position the microplate holder so that a selected well (or a portion of the well) is in the field of view of the optical detector and selects a DC power source of the plurality of DC power sources and electrically couples a first or default DC power source to the optical detector. In one embodiment the controller then operates the stimulus source to provide a stimulus to the product sample and obtains a first measurement of a signal generated by the optical detector in response to detection of light transmitted through, reflected from, or emitted by the product sample as a result of such stimulus. The same controller analyzes the first signal measurement and selects either the same DC power source or a different DC power source in accordance with the magnitude of the measured signal and electrically couples the selected DC power source to the optical detector. Thereafter, the controller again operates the stimulus source and obtains and records a second measurement of the signal generated by the optical detector that results from such stimulus. The microplate reader iterates in this manner until all of the product samples have been analyzed. The product samples of each microplate may be analyzed a single time or, in the case that kinetic measurements are to be obtained, the product samples of one or more microplates may be analyzed in the above-described manner multiple times. While it is possible to use the first measurement as the second measurement in the event a determination is made that the first DC power source is the proper supply to obtain the measurement (thus resulting in a single measurement), it may be preferred to obtain separate first and second measurements using the same DC power source so that a constant timing is realized from microplate to microplate in an automated environment and to facilitate kinetic measurements in which measurements are repeated at selected constant intervals.

While the embodiments comprising the systems and methods disclosed herein are shown in conjunction with an optical detector in the form of a photomultiplier tube (PMT), it should be understood that the circuits and methods may instead be used with a different optical detector, such as an avalanche photodiode or other device.

Referring to FIG. 1, in accordance with one or more embodiments, a microplate reader system 2 includes a microplate holder 4, a microplate positioning mechanism 6, an illumination source 8, an optical detector 10, and a controller 12. For sake of clarity, other components of the microplate reader system 2 such as a focus mechanism, one or more filters, a mechanism to deliver a chemical or electrical stimulus to a product sample disposed on the microplate holder 4, one or mirrors to direct light from the illumination source 8 to the product sample and/or from the product sample to a field of view of the optical detector 10, and the like are not shown in FIG. 1.

During operation of the microplate reader system 2, a microplate 14 is disposed on the microplate holder 4 either manually or robotically. The microplate 14 includes a plurality of wells 16 and the product samples may be disposed in each such well 16, wherein each product sample includes, for example, one or more biological cells or portions thereof.

The controller 12 actuates the microplate positioning mechanism 6 to move the microplate holder 4 so that a selected well 16 or a portion thereof is in the field of view of the optical detector 10. Alternatively, the optical detector 10 may be movable and the wells 16 may be stationary. In either event, the controller 12 then operates the illumination source 8 to illuminate the selected well 16 with one or more particular wavelengths of light. Light from the illumination source 8 that is not absorbed or reflected by the product sample disposed in the selected well 16 is transmitted through the product sample and detected by the optical detector 10. In response, the optical detector 10 generates an electrical signal that is measured and recorded by the controller 12.

If the product sample is fluorescent (either naturally or by being labeled with a fluorescent dye), the controller 12 operates the illumination source 8 to generate light that causes the product sample to fluoresce, and light emitted by such fluorescence is detected by the optical detector 10, which generates the electrical signal that is measured and recorded by the controller 12. In some cases, the controller 12 may operate a mechanism to deliver a chemical stimulant that causes the product sample to fluoresce, light emitted during such fluorescence is detected by the optical detector 10, and the signal generated by optical detector 10 in response to such detection is measured and recorded by the controller 12.

The controller 12 repeatedly operates the microplate positioning mechanism 6, the illumination source 8, and the optical detector 10 in this manner until signals generated by light transmitted through or emitted by the product samples in all of the wells 16 of the microplate 14 that are of interest have been measured and recorded. Alternatively, the product samples may be measured multiple times when kinetic measurements are to be obtained.

Figure 2:
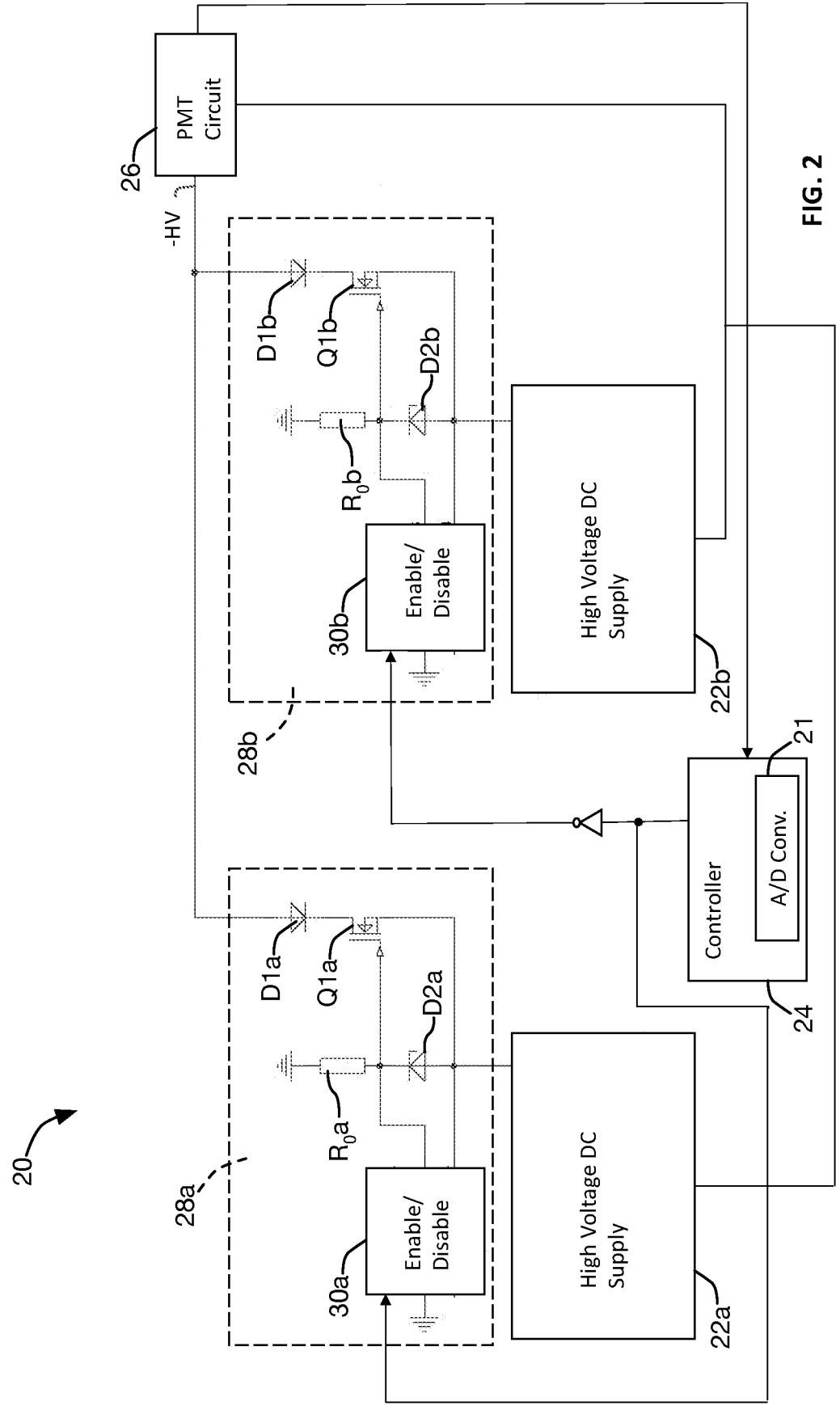
FIG. 2 is a block diagram of a first embodiment of a measurement system of the microplate reader system of FIG. 1.

Referring to FIGS. 1 and 2, in a preferred embodiment, the optical detector 10 is coupled to a measurement system 20 operable by a controller 24, which may be integral with the controller 12 described above or separate from and directed by the controller 12. In addition, the controller includes or is coupled to an analog-to-digital converter (ADC) 21 that converts a signal generated by the measurement system 20 into a digital value.

Referring to FIG. 2, a first embodiment of a measurement circuit 20 is illustrated. The system 20 includes at least two high voltage DC power sources 22a, 22b that develop voltage magnitudes comprising negative voltage output levels of, for example −500 volts and −1000 volts, respectively. A programmable device, which may comprise the controller 24, is responsive in the manner noted hereafter to selectively couple a photomultiplier (PMT) circuit 26 to one of the DC power sources 22a, 22b via a controllable circuit comprising switching circuits 28a, 28b.

In the illustrated embodiment, the switching circuits 28a, 28b are identical and are controlled by the controller 24. It should be noted that the circuits 28a, 28b need not be identical and/or the design of each circuit may be varied from that illustrated as desired. Because the circuits 28a, 28b are identical, only the circuit 28a will be described in detail. As shown in FIG. 2, the circuit 28a includes a transistor Q1a, which may comprise a MOSFET or any other controllable switching device, and a diode D1a coupled between the PMT circuit 26 and a drain electrode of the transistor Q1a. A Zener diode D2a is coupled between source and gate terminals of the transistor Q1a and a biasing resistor $R_0a$ is coupled between the gate electrode and ground potential.

The controller 24 develops a control signal that is supplied in non-inverted form to an enable/disable device or circuit 30a. In one embodiment, the enable/disable device or circuit 30a comprises a phototransistor or other opto-coupler that isolates the controller 24 from the high voltage of the DC power source 22a.

The switching circuit 28b includes transistor Q1b, diode D1b, Zener diode D2b, biasing resistor Rob, and enable/disable device or circuit 30b, wherein the element 30b receives the control signal developed by the controller 24 in inverted form.

Figure 3:
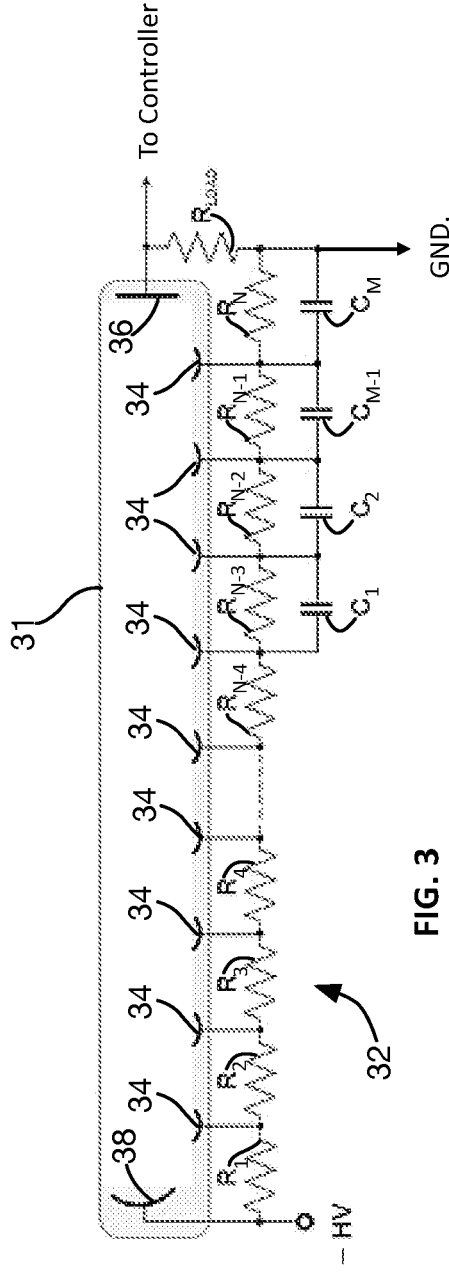
FIG. 3 is a simplified schematic diagram of the PMT circuit of FIG. 2.

Referring to FIG. 3, in the simplified illustrated embodiment, the PMT circuit 26 comprises a PMT 31, a voltage divider circuit 32 comprising a plurality of resistors $R_1$, $R_2$, . . . , $R_N$ coupled to one another and further coupled across adjacent dynodes 34 of the PMT 30, capacitors $C_1$, $C_2$, . . . , $C_M$ coupled across some of the resistors $R_1$, $R_2$, . . . , $R_N$ of the voltage divider circuit 32 and a load resistor $R_{Load}$ coupled between an anode 36 of the PMT 31 and ends of the resistor $R_N$ and capacitor $C_M$. It may be noted that $R_{Load}$ may instead be realized by electronic circuitry, such as an integrator or a transimpedance amplifier, if desired. An output of the PMT circuit 26 is developed across the load resistor $R_{Load}$. A photocathode 38 of the PMT 31 and the load resistor $R_{Load}$ are coupled to negative and positive voltage potentials, −HV and ground, respectively, of one of the high voltage DC power sources 22a, 22b, as described in greater detail hereinafter.

Figure 4:
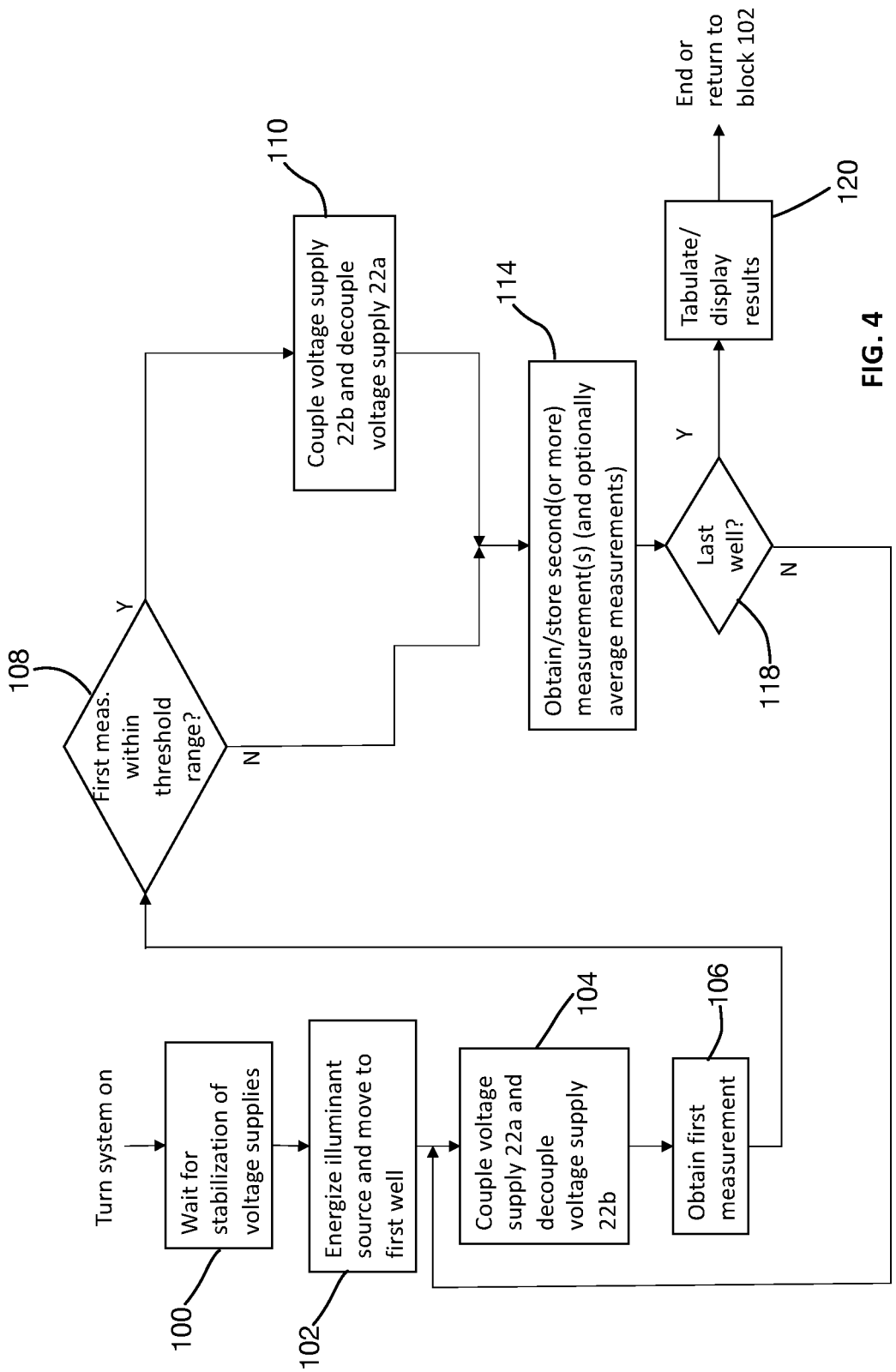
FIG. 4 is a flowchart of programming executed by the controller of FIG. 2.
Figure 5:
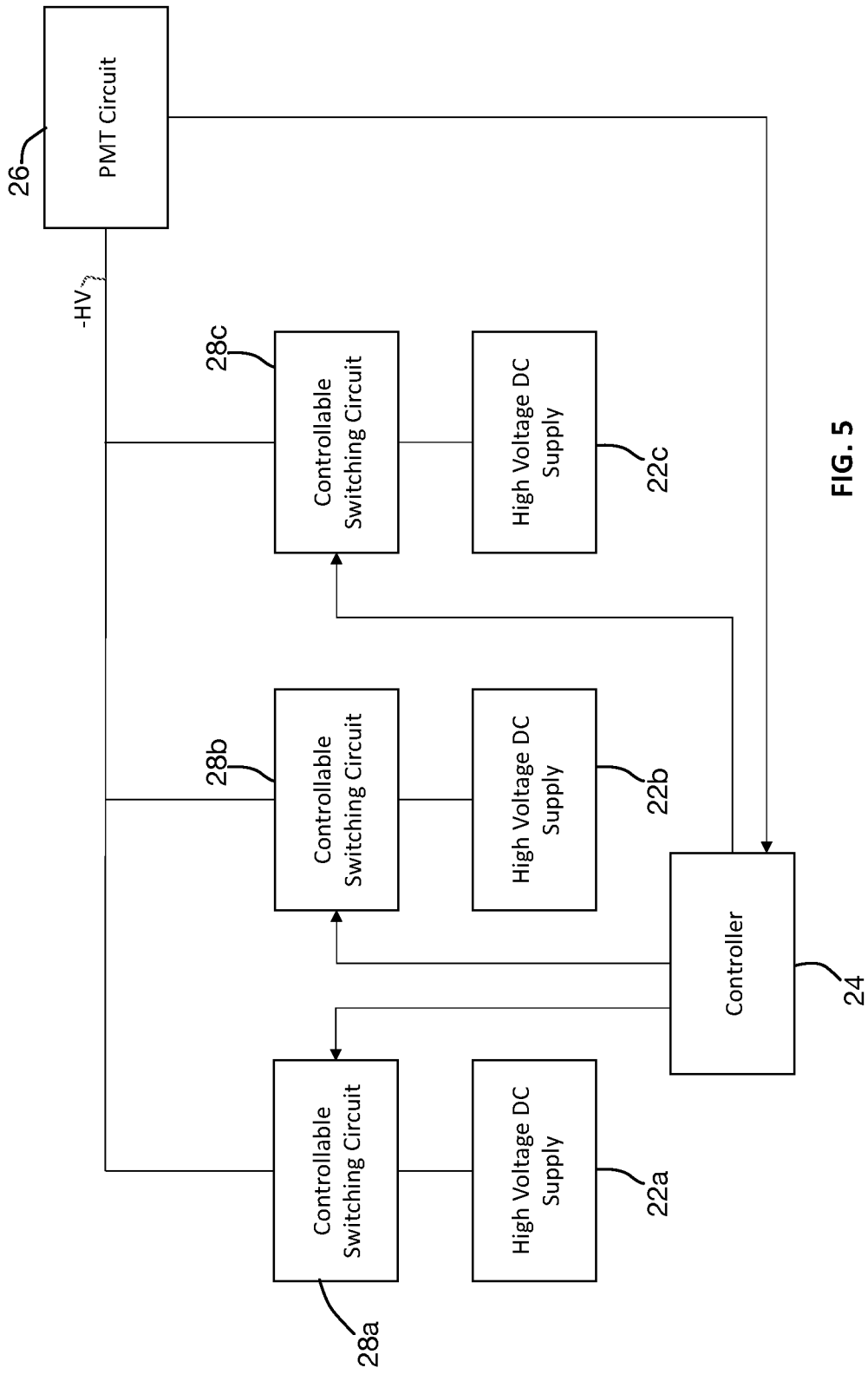
FIG. 5 is a block diagram of a second embodiment of a measurement system of the microplate reader system of FIG. 1.
Figure 6:
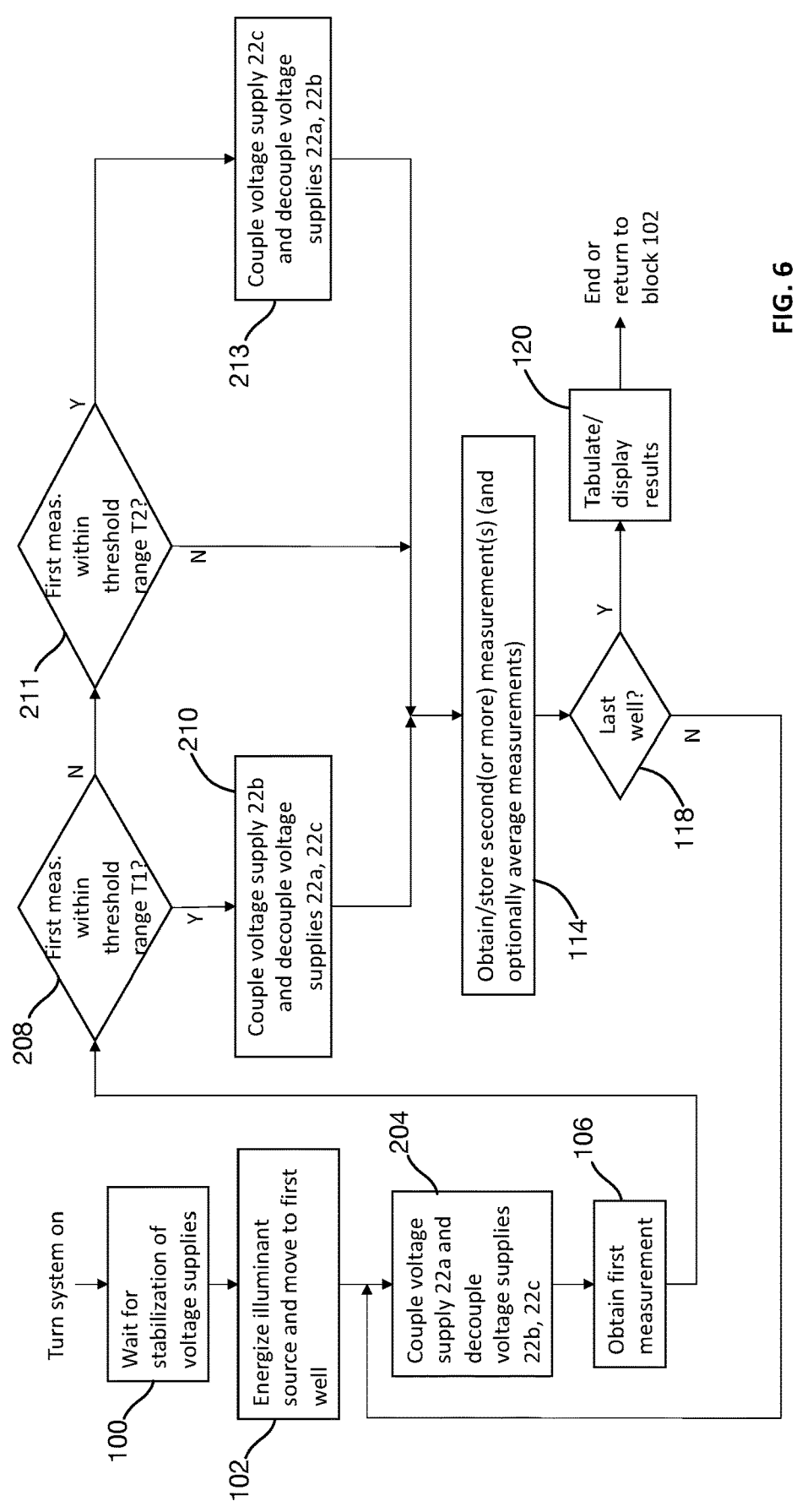
FIG. 6 is a flowchart of programming executed by the controller of FIG. 5.

The controller 24 is preferably a programmable device of any suitable type that executes programming, for example, as shown in FIG. 4 or 6, responsive to the output signal of the PMT circuit 26. Specifically, FIG. 4 illustrates a flowchart of programming for operating the measurement system 20 of FIG. 2 whereas the flowchart of FIG. 6 represents programming for operating the circuit of FIG. 5 as described in greater detail hereinafter.

Referring to FIG. 4, following system energization, a block 100 senses the outputs of the DC power sources 22a, 22b and delays further execution of programming until the outputs of the power sources 22a, 22b have sufficiently stabilized. In some embodiments, the block 100 may wait until a particular period of time has elapsed for the outputs to sufficiently stabilize. Once the DC power source outputs have stabilized, a block 102 energizes the illuminant source (e.g., a flash lamp) and moves the measurement head to a position proximate a first measurement well. Thereafter, a block 104 couples a first selected one of the DC power sources 22a, in this case the DC power source 22a, to the PMT circuit 26. This is accomplished by providing, for example, a high state control signal to the enable/disable device or circuit 30a, thereby turning the transistor Q1a on at a first time. This, in turn, couples the −500 volt DC power source 22a to the PMT circuit 26. Also, the supply of the inverted control signal to the enable/disable device or circuit 30b turns the transistor Q1b off also at the first time so that the DC power source 22b is decoupled from the PMT circuit 26.

A block 106 then operates the PMT circuit 26 to obtain a first measurement voltage magnitude resulting from sensing of the product sample following the first time. The first measurement may comprise a partial or full measurement operation, as desired. A block 108 evaluates the first measurement voltage magnitude to determine whether a characteristic of the first measurement is within a selected threshold range (in the description herein, descriptions of measurements and ranges reference the absolute magnitudes of signals and ranges). For example, the block 108 may compare the first measurement voltage magnitude across the load resistor $R_{Load}$ to a selected threshold range between zero and a selected threshold limit. The threshold limit may be selected in dependence upon a sensitivity versus supply voltage characteristic or other characteristic of the PMT 31. In a particular embodiment the selected threshold limit is approximately 0.9% of the full-scale measurement range of the PMT circuit 26. The full-scale measurement range may be of any suitable magnitude, for example, four orders of magnitude.

If the block 108 determines that the first measurement voltage magnitude is within the selected threshold range a block 110 switches the state of the control signal to selectively couple the DC power source 22b to the PMT circuit 26 and selectively decouple the DC power source 22a from the circuit 26, wherein the block 110 is operable at a second time subsequent to the first time. This combined function of the blocks 108, 110 permits a subsequent second measurement to be obtained with the −1000 volt DC power source 22b coupled to the PMT circuit 26 while ensuring that the PMT circuit 26 is set to a higher sensitivity in order to generate a more precise signal across $R_{Load}$. Further, because the output voltage of the −1000-volt DC power source 22b is already stable, switching from the −500-volt DC power source 22a to the −1000-volt DC power source 22b does not require any wait time for the voltage generated by the −1000-volt DC power source to stabilize. On the other hand, if the block 108 determines that the first measurement voltage magnitude is not within the selected threshold range the state of the control signal remains unchanged such that the DC power source 22a remains coupled to the PMT circuit 26 and the DC power source 22b is decoupled therefrom at the second time. The decoupling of the DC power source prevents an overflow condition of the ADC 21.

Following the blocks 108 and 110, control passes to a block 114, which operates the PMT circuit 26 to obtain a second measurement voltage magnitude resulting from sensing of the product sample at a time after the second time. Alternatively, the block 114 may obtain any number of third, fourth, fifth, etc. additional measurements of each sample using the same DC power source used for the second measurement and the measurements may be averaged to increase measurement accuracy.

Referring again to FIG. 4, in the illustrated embodiment the second measurement voltage magnitude is stored in a table by the block 114 and a block 118 then checks to determine whether product samples in all of the wells have been sensed (the second measurement of each product sample may be undertaken a single time or multiple times). If not, control returns to the block 104 so that the DC power source 22a is again coupled to the PMT circuit 26 so that additional first and second measurements are obtained. Once first and second measurements of product samples in all wells have been obtained, a block 120 causes the second measurement voltage magnitudes to be tabulated and/or displayed and the process ends. Alternatively, control may return to the block 102 for additional measurements if kinetic measurements are to be obtained.

In some embodiments, the illuminant source may be energized before the second measurement is undertaken by the block 114. Further, in some cases the energization of the illuminant source may be undertaken concurrently with or shortly after coupling of the DC power source 22b by the block 110.

The system 20 couples a second selected one of the DC power sources 22a, 22b to the PMT circuit 26 based upon a first sample measurement, which can be detected and evaluated in a brief period of time much shorter than the time required by a single high voltage DC power source 22a, 22b to settle when switching between levels. Further, selection of one of the DC power sources 22a, 22b to couple to the PMT circuit 26 based on an evaluation of the first sample measurement allows second measurement of wide dynamic range signals in an efficient manner that permits maximum measurement sensitivity, and/or resolution, and/or accuracy.

FIG. 5 illustrates a further embodiment similar to the foregoing embodiment in which one of three (or more) high voltage DC power sources, such as DC power sources 22a, 22b, 22c, are selectively coupled by switching circuits 28a, 28b, 28c to the PMT circuit 26 under the control of the controller 24 based upon a first product sample measurement. In the illustrated embodiment of FIG. 5, the DC power sources 22a and 22b develop voltage levels of −500 and −1000 volts, respectively, and the DC power source 22c develops an intermediate voltage level of −750 volts. Also, in the embodiment illustrated in FIG. 5, each of the switching circuits 28 is identical to the switching circuits 28a and 28b of FIG. 2, and the controller 24 and the PMT circuit 26 of FIG. 5 are identical to the controller 24 and PMT circuit 26, respectively, of FIG. 2, except for the programming described below.

FIG. 6 illustrates programming executed by the controller 24 in connection with the embodiment of FIG. 5. The flowchart of FIG. 6 includes the blocks 100, 102, 106, 114, 118, and 120 of FIG. 4. The block 104 is replaced by a block 204 that is operable at the first time to couple a first selected one of the DC power sources 22, in this case the −500 volt DC power source 22a, to the PMT circuit 26 and decouple the −1000 volt and −750 volt DC power sources 22b, 22c from the PMT circuit 26. Once the first measurement voltage magnitude is obtained by the block 106 after the first time control passes to a block 208, which evaluates the first measurement voltage magnitude to determine whether such measurement magnitude is at within a first selected threshold range T1. If this is the case, control passes to a block 210 operable at the second time to couple a second selected one of the power sources 22, in the illustrated embodiment, the −1000 volt DC power source 22b, to the PMT circuit 26. On the other hand, if the block 208 determines that the voltage magnitude of the first measurement is outside the threshold range T1, then a block 211 checks to determine whether the voltage magnitude of the first measurement is within a second selected threshold range T2. If this is found to be the case, a block 213 instead couples the PMT circuit 26 to a different second selected one of the power sources 22, specifically, in the illustrated embodiment, the −750 volt DC power source 22c, and decouples the PMT circuit from the −500 volt and −1000 volt DC power sources 22a, 22b, respectively.

Control from the blocks 210 and 213, and from the block 211 if such block determines that the first measurement voltage magnitude is outside the second selected threshold range T2, passes to the block 114.

Like in the previous embodiment, the selected threshold ranges T1 and T2 may be selected in dependence upon a sensitivity versus supply voltage characteristic or other characteristic of the PMT 31. In a specific embodiment the threshold range T1 may comprise zero to approximately 0.9% of the full-scale voltage magnitude of the PMT circuit 26 and the threshold range T2 may comprise zero to approximately 9.0% of the full-scale voltage magnitude of the PMT circuit 26. As in the previous embodiment, the threshold ranges T1 and T2 are selected so that overflow of the analog-to-digital converter 21 of the controller 24 as a result of the second measurement is avoided.

In terms of settling speed it may instead be advantageous in the embodiment of FIGS. 5 and 6 to obtain the first measurement by coupling the intermediate voltage (i.e., −750 volts) to the PMT circuit 26 and to transition to −1000V or −500V or remain at −750 volts for the second measurement. Still further, in other embodiments, one could alternatively obtain the first measurement using another of the DC power sources, such as the −1000 volt DC power source 22b, compare the first measurement to appropriate range(s), and either transition to another of the DC power sources or use the same DC power source based upon the comparison to obtain the second measurement.

In general, as should be evident from the foregoing, any number of DC power sources 22a, 22b, . . . , 22Z and switching circuits 28a, 28b, . . . , 28Z could be provided and operated by the controller 24 to couple selectively one of the DC power sources 22 to the PMT circuit 26. The choice of which DC power source 22 to couple to the PMT circuit is dependent upon one or more first measurement(s) and the characteristic(s) of the PMT 31 and/or the circuit 26, such as measurement sensitivity and/or measurement resolution and/or measurement accuracy, and/or a desirable balance thereof, as a function of detected magnitude of the first measurement. A fast, real-time acquisition of product sample measurements over an extended dynamic detector range can be achieved. Thus, in certain embodiments, for example, a settled voltage change between maximum and minimum voltage levels may be achieved within a few milliseconds (e.g., 5 milliseconds) or less, which may result in a desirable increase in an illuminant flash rate of the light source. This solution reduces the measurement time by 50% in relation to currently used methodology. This is desirable also for long term kinetic measurements of multiple samples and enables high throughput screening methods within the microplate reader range. Measurements can be obtained at constant time intervals independent of sample concentration. Any number of third, fourth, fifth, etc. additional measurements may be taken for each sample using the same DC power source used for the second measurement and the measurements may be averaged and tabulated to increase measurement accuracy.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer, an application specific integrated circuit (ASIC), a field-programmable gate array (FPGA), or an electronic circuit. In some embodiments, some one or more of the most important method steps may be executed by such an apparatus.

It should be apparent to those who have skill in the art that any combination of hardware and/or software may be used to implement components of the microplate reader 2 described herein. It will be understood and appreciated that one or more of the processes, sub-processes, and process steps described in connection with FIGS. 1-6 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules depicted in FIGS. 1-6. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the controller(s) 12 and 24 and the measurement circuit 20 of FIGS. 1 and 2), which includes, for example, one or more microprocessors, general purpose processors, combinations of processors, digital signal processors (DSPs), field programmable gate arrays (FPGAs), application-specific integrated circuits (ASICs), and/or graphics processing units (GPUs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

Depending on certain implementation requirements, the embodiments described can be implemented in hardware and/or in software. The implementation can be performed using a non-transitory storage medium such as a digital storage medium, for example, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according comprise a data carrier having electronically readable control signals, which are capable of cooperating with a processor, a controller, or a programmable computer system, such that one of the methods described herein is performed.

Generally, embodiments disclosed herein can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein, stored on a machine-readable carrier.

In other words, an embodiment, therefore, may include a computer program having a program code for performing one of the methods described herein, when the computer program runs on a processor, a controller, and/or a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitory. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While particular embodiments of the present invention have been illustrated and described, it would be apparent to those skilled in the art that various other changes and modifications can be made and are intended to fall within the spirit and scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

As used herein the term "and/or" includes any and all combinations of one or more of the associated listed items.

Numerous modifications to the present disclosure will be apparent to those skilled in the art in view of the foregoing description. It should be understood that the illustrated embodiments are exemplary only and should not be taken as limiting the scope of the disclosure.

We claim:

1. A measurement system, comprising:
an optical detector;
a plurality of power sources operable to provide different outputs;
a controllable circuit operable to couple a first selected one of the plurality of power sources to the optical detector; and
a programmable device operable when each of the plurality of power sources is providing an associated power output to: (a.) obtain a first measurement from the optical detector while the first selected one of the plurality of power sources is coupled to the optical detector; (b.) cause the controllable circuit to couple a second selected one of the plurality of power sources to the optical detector in response to the first measurement; and (c.) obtain a second measurement from the optical detector while the second selected one of the plurality of power sources is coupled to the optical detector.

2. The measurement system of claim 1, wherein the optical detector comprises a photomultiplier tube.

3. The measurement system of claim 1, wherein the programmable device comprises an analog-to-digital converter and the programmable device is operable to select one of the plurality of power sources to prevent overflow of the analog-to-digital converter.

4. The measurement system of claim 1, wherein the programmable device compares the first measurement to at least one selected threshold range.

5. The measurement system of claim 1, wherein the programmable device is further operable to couple one of the power sources to the optical detector based on a comparison of the first measurement to at least one selected threshold range.

6. The measurement system of claim 1, wherein the plurality of power sources comprises first and second power sources.

7. The measurement system of claim 1, wherein the plurality of power sources comprises first, second, and third power sources.

8. The measurement system of claim 1, wherein the first selected one of the plurality of power sources is identical to the second selected one of the plurality of power sources.

9. The measurement system of claim 1, wherein the optical detector is operable to develop a measurement voltage magnitude in response to a sensing of a product sample.

10. The measurement system of claim 1, wherein the first measurement and the second measurement are a first voltage magnitude and a second voltage magnitude, respectively, and the programmable device is operable to obtain one or more measurements from the optical detector while the second selected one of the plurality of power sources is coupled to the optical detector and is further operable to average measurements in the event that more than one measurement is obtained.

11. The measurement system of claim 1, further including a third power source that develops a third output, wherein the controllable circuit is operable to couple a first selected one of the first, second, and third power sources to the optical detector at a first time, and wherein the programmable device is operable to cause the controllable circuit to couple a second selected one of the first, second, and third power sources to the optical detector at a second time subsequent to the first time and obtain the second measurement while the second selected one of the first, second, and third power sources is coupled to the optical detector.

12. The measurement system of claim 1, wherein the first selected one of the plurality of power sources is different than the second selected one of the plurality of power sources and wherein the programmable device is operable to decouple the first selected one of the plurality of power sources from the optical detector at a first time and couple the second selected one of the power sources to the optical detector at a second time five milliseconds or less following the first time.

13. An optical measurement method, comprising:
(a.) providing a photomultiplier tube (PMT) circuit operable to measure an optical characteristic of a sample, at least first and second power sources that develop first and second different power source output voltages, respectively, a controllable circuit operable in response to at least one control signal to selectively couple the PMT circuit to one of the at least the first power source and the second power source, and a programmable device; and
(b.) operating the programmable device to develop the at least one control signal and to undertake the steps of
(i.) causing the controllable circuit to couple the PMT circuit to the first power source;
(ii) obtaining a first measurement from PMT circuit while the PMT circuit is coupled to the first power source;
(iii.) evaluating a characteristic of the first measurement;
(iv.) causing the controllable circuit to couple the PMT circuit to a selected one of the at least first and second power sources based upon the evaluated characteristic of the first measurement; and
(v.) obtaining a second measurement from the PMT circuit after the step (b.)(iv.) while the selected one of the first and second power sources is coupled to the PMT circuit.

14. The optical measurement method of claim 13, wherein the programmable device is operable while undertaking step (b.)(iii.) to compare a voltage magnitude developed by the PMT circuit to at least one selected threshold range.

15. The optical measurement method of claim 14, wherein the at least one selected threshold range is selected to prevent overflow of an analog-to-digital converter that receives the second measurement.

16. The optical measurement method of claim 13, wherein the step (a.) further comprises the step of providing a third power source that develops a third power source output voltage different than the first and second power source output voltages, wherein the controllable circuit is operable to couple the PMT circuit to a first selected one of the first, second, and third power sources to the PMT circuit, and at step (b.)(iv.) causing the controllable circuit to couple the PMT circuit to a second selected one of the first, second, and third power sources based upon the evaluated characteristic of the first measurement.

17. The optical measurement method of claim 15, wherein the step (b.)(iv.) causes the controllable circuit to couple the PMT circuit to the first power source.

18. The optical measurement method of claim 13, wherein the selected one of the at least first and second power sources comprises the second power source and wherein the programmable device is operable to decouple the first power source from the PMT circuit at a first time and couple the second power source to the PMT circuit at a second time five milliseconds or less following the first time.

* * * * *